US009177227B2

(12) United States Patent
Chehaiber

(10) Patent No.: US 9,177,227 B2
(45) Date of Patent: Nov. 3, 2015

(54) METHOD AND DEVICE FOR FINDING NEAREST NEIGHBOR

(75) Inventor: Moatasem Chehaiber, Rødovre (DK)

(73) Assignee: IVISYS APS, Kopenhamn (DK)

( * ) Notice: Subject to any disclaimer, the term of this patent is extended or adjusted under 35 U.S.C. 154(b) by 80 days.

(21) Appl. No.: 13/990,246

(22) PCT Filed: Dec. 15, 2011

(86) PCT No.: PCT/DK2011/050487
§ 371 (c)(1),
(2), (4) Date: May 29, 2013

(87) PCT Pub. No.: WO2012/079588
PCT Pub. Date: Jun. 21, 2012

(65) Prior Publication Data
US 2013/0251269 A1  Sep. 26, 2013

Related U.S. Application Data

(60) Provisional application No. 61/429,268, filed on Jan. 3, 2011.

(30) Foreign Application Priority Data

Dec. 17, 2010 (DK) .................................. 2010 70560

(51) Int. Cl.
*G06K 9/48* (2006.01)
*G06K 9/62* (2006.01)
*G06F 17/30* (2006.01)
*G06K 9/46* (2006.01)

(52) U.S. Cl.
CPC ........ *G06K 9/6267* (2013.01); *G06F 17/30247* (2013.01); *G06K 9/4671* (2013.01); *G06K 9/6276* (2013.01)

(58) Field of Classification Search
None
See application file for complete search history.

(56) References Cited

U.S. PATENT DOCUMENTS

| 6,049,859 | A | 4/2000 | Gliese et al. |
| 6,711,293 | B1 * | 3/2004 | Lowe ............................. 382/219 |
| 8,478,052 | B1 * | 7/2013 | Yee et al. ...................... 382/224 |
| 2005/0265633 | A1 | 12/2005 | Piacentino et al. |
| 2007/0003152 | A1 | 1/2007 | Hoppe et al. |
| 2010/0067745 | A1 | 3/2010 | Kovtun et al. |
| 2010/0169576 | A1 | 7/2010 | Chen |

FOREIGN PATENT DOCUMENTS

| EP | 2138978 A | 12/2009 |
| WO | 9739422 A | 10/1997 |

(Continued)

OTHER PUBLICATIONS

David Lowe, Distinctive Image Features From Scale-Invariant Keypoints, International Journal of Computer Vision, 2004, vol. 60 (2), pp. 91-110.*

(Continued)

*Primary Examiner* — Chan Park
*Assistant Examiner* — Mai Tran
(74) *Attorney, Agent, or Firm* — Remarck Law Group PLC

(57) ABSTRACT

The present invention relates to a method and a device for finding nearest neighbor. In particular, it relates to a sorting, searching and matching multiple dimensional data, such as vectors, in order to find the nearest neighbor. The method is particularly useful as part of a SIFT algorithm.

10 Claims, 19 Drawing Sheets

Illustration example of points mapping in circles on Euclidean space

(56) References Cited

FOREIGN PATENT DOCUMENTS

WO   2004055724 A   7/2004
WO   2006083277 A   8/2006

OTHER PUBLICATIONS

Charles F. Hester, Multivariant Technique for Multiclass Pattern Recognition, Applied Optics, 1980, vol. 19 (11).*

Bandyopadhyay, S. et al., "Efficient Prototype Reordering in Nearest Neighbor Classification," Pattern Recognition, vol. 35, No. 12, Dec. 2002, pp. 2791-2799.

Bohm, C. et al., "Efficient Similarity Search in Digital Libraries," Advances in Digital Libraries 2000, Proceedings IEEE, Washington D.C., May 22-24, 2000, pp. 193-199.

Feng, H. et al., "Parallelization and Characterization of SIFT on Multi-Core Systems," Workload Characterization, IEEE International Symposium, Sep. 14, 2008, pp. 14-23.

Greenspan, M. et al., "Acceleration of Binning Nearest Neighbour Methods," Proceedings of Vision Interface 2000, May 14, 2000, pp. 337-344.

International Search Report dated Jun. 19, 2012 for PCT International Application No. PCT/DK2011/050486, 4 pages.

International Search Report dated Mar. 22, 2012 for PCT International Application No. PCT/DK2011/050487, 3 pages.

Liao, S. et al., "High Dimensional Similarity Search With Space Filling Curves," Proceedings 17th International Conference on Data Engineering, Heidelberg, Germany, Apr. 2-6, 2001, pp. 615-622.

Park, J. et al., "An Efficient Memory System for the SIMD Construction of a Gaussian Pyramid," IEEE Transactions on Parallel and Distributed Systems, IEEE Service Center, Los Alamitos, CA, vol. 7, No. 8, Aug. 1, 1996, pp. 855-860.

Popkin, T. et al., Accurate and Efficient Method for Smoothly Space-Variant Gaussian Blurring,. IEEE Transactions on Image Processing, May 2010, vol. 19, No. (5), pp. 1362-1370.

Ruiz, V., "An algorithm for finding nearest neighbours in (approximately) constant average time," Pattern Recognition Letters 4, Jul. 1986, pp. 145-157.

Warn, S. et al., "Accelerating SIFT on Parallel Architectures," Cluster Computing and Workshops, 2009, Cluster '09 IEEE International Conference, Aug. 31, 2009, pp. 1-4.

Ye, L. et al., "Autocannibalistic and Anyspace Indexing Algorithms with Applications to Sensor Data Mining," Dept. of Computer Science & Eng., University of California, Riverside, 2009, pp. 85-96.

EPO Communication Pursuant to Article 94(3) EPC dated May 30, 2014 for European Patent Application No. 11804945.1, 4 pages.

* cited by examiner

Number of searches as function of Data base size in number of reference points

Illustrative example of re-arranged memory

Illustration example of points mapping in circles on Euclidean space

Sorted FIFO location data fields

Illustration example of data arrangement in the extended FIFO

Coarse fetch by successive approximation method

Step 1

Calculate the distance between the incoming data vector and the common reference data vector. Name the result as "res0". In case the calculated distance is found to be "0" then the nearest neighbor is found to be the common reference data vector and the search is successfully terminated

Step 2

Find the data vector located in the middle of the search memory space containing the reference data vectors and calculate the distance between that vector and the common reference data vector. Name the result as "res1"

Step 3

Compare the 2 previous calculated values (e.g. res0 and res1). In case res1 is greater than res0, this means that there is probably a data set in the upper half of the memory space which has a distance to the common reference point closer to the distance between the common reference point and the incoming data vector. Hence the search memory space is reduced to the upper half of the current memory space. Similarly In the opposite case where res1 is less than res0 the successive search will be limited to the lower half of the memory space. In the last case where res1 and res0 are equal, jump to fine search (see fine fetch)

Step 4

Repeat steps 2 and 3 until search memory space contains a single data vector set

Step 5

Go to fine fetch (see fine fetch)

Fig. 5D

Fine fetch by successive approximation

Step 1

Set the search memory space for a nearest neighbor to the incoming data vector equal the total memory space occupied by the current data set where the first element of the data set occupies the first location while last element in the data set occupies the last address in that memory space

Step 2

Calculate the distance between the incoming data vector and the data vector in the middle of the selected memory sub-space. The middle element is found, aided by the size /index and repeated flag data fields. For instance, the memory address of the middle element of a data set is calculated as follows: {middle_element_ address= Current_ address –index + $floor$(size/2)}. The $floor$ function rounds to the nearest lower integer.

Step 3

Calculate the distances between the incoming data vector and the data vectors at one address in the forwards direction and one address in the backwards direction in the selected memory space.

Step 4

1. In the case where at least one of the distances calculated in the previous steps is "0", then the nearest neighbor is considered found and the search terminates successfully. The nearest neighbor is then the data vector with the "0" distance to the incoming vector.
2. In the case where the 2 calculated distances in the previous step are found to be equal, or both are greater than the distance calculated in step 2, then the search moves to neighbor data vector sets jumping to step 7. In this case the nearest neighbor within the current data vector set, is considered to be the middle data vector and its distance to the incoming data vector is kept as current minimum.
3. Otherwise In case the distance of the incoming vector to the middle element is shorter than the distance to the one forwards element, the nearest neighbor to the incoming vector within the data set is assumed to be found in the lower part of the current search memory space.
4. In case the distance to the middle element is shorter than the distance to the one backwards element, then the nearest neighbor within the set is assumed to be found in the higher part of the search memory space for the set. Hence the search memory space is reduced to the upper or lower half of the actual space accordingly. In the cases where the search do not terminate, the minimum of the calculated distance is kept as the current minimum

Fig. 5E

Fine fetch by successive approximation (continued)

Step 5

Calculate the distance between the incoming data vector and the data vector in the middle of the selected memory sub-space in the previous step.

Step 6

Compare the calculated distance in the previous step with the kept minimum and evaluate the following cases:

1. In case the calculated distance is equal to the kept minimum, then the search terminates successfully concluding that the nearest neighbor is the common reference point. (will be discovered earlier during the coarse fetch process )
2. In case the calculated distance is greater than the kept minimum, it means that the search has passed the nearest neighbor within the data set and hence the new search memory space is set to a sub-space, limited by the previous 2 middle points and steps 2 to 5 are repeated until successful termination or jumping to step 7
3. In case the calculated distance in the previous step is found less than the kept minimum, it means that the nearest neighbor within the current data set is found further in the selected direction, then the search sub-space is redefined accordingly and steps 2 to 5 are repeated until successful termination or jumping to step 7

Step 7

All Neighboring data sets having a distance difference to the previous data vector set not greater than the established minimum by the previous steps are investigated for a nearer neighbor following the steps from 1 to 6 until the nearest neighbor is found.

Fig. 5F

Flow diagram for fine sorting process

Coarse Fetching and data vector matching flow diagram

Fine fetching and matching process; Flow diagram (method #2 for small databases)

Fine fetching and matching process; Flow diagram (continued)

Fine fetching and matching process; Flow diagram (continued)

Fine fetching and matching process; Flow diagram (continued)

METHOD AND DEVICE FOR FINDING NEAREST NEIGHBOR

CROSS-REFERENCE TO RELATED APPLICATIONS

This application is a 371 U.S. National Stage of International Application No. PCT/DK2011/050487, filed Dec. 15, 2011, which claims priority to U.S. Provisional Application Ser. No. 61/429,268, filed Jan. 3, 2011 and Danish Application Serial No. PA 201070560, filed Dec. 17, 2010. The disclosure of each of the above applications is incorporated herein by reference in their entirety.

The present invention relates to a method and a device for finding nearest neighbor. In particular, it relates to a sorting, searching and matching multiple dimensional data, such as vectors, in order to find the nearest neighbor. The method is particularly useful as part of a SIFT algorithm.

TECHNICAL BACKGROUND

Lowe, inventor of the U.S. Pat. No. 6,711,293 B1, used a modification of the k-d tree algorithm known as the Best-bin-first search method that can identify the nearest neighbors with high probability using only a limited amount of computation.

US 2010/0067745 discloses a method for object clustering and identification in video. In particular, it concerns the identification of facial images. The method uses clusters of video objects which are likely associated with the same person. A new image is deemed to belong to an existing cluster if the distance to the cluster is smaller than a first predetermined threshold distance. The new image becomes part of the cluster if the distance is larger than a second threshold distance (smaller than the first threshold distance).

Ye, L., et al., "Autocannibalistic and Anyspace Indexing Algorithms with Applications to Sensor Data Mining", Dept. of Computer Science & Eng., University of California, Riverside, USA, 85-96, provides an altered Orchard algorithm. Here, speed is sacrificed in order to reduce memory requirement. It is a design choice how much speed is sacrificed to save memory. However, the algorithm in any case requires a minimum of space. In Orchards algorithm, for each item in a dataset, a sorted list of its neighbors is calculated. This requires large amounts of memory for large dataset. In the altered Orchard algorithm, rows for items which are close to each other are deleted to save space. Thus, the search algorithm sacrifices speed for memory space. Ye et al. further suggests dynamic memory allocation for optimizing the algorithm.

Vidal Ruiz, E., "An algorithm for finding nearest neighbours in (approximately) constant average time", Pattern Recognition Letters 4 (1986), 145-157, relates to an algorithm for finding the Nearest Neighbour of a given sample in approximately constant average time complexity (i.e. independent of the data set size).

SUMMARY OF THE INVENTION

The nearest neighbor search problem (nearest neighbor search, also known as proximity search, similarity search or closest point search) arises in numerous fields of application, including, but not limited to: Pattern recognition (in particular for optical character recognition); statistical classification (k-nearest neighbor algorithm); computer vision; content-based image retrieval in databases; coding theory; data compression; recommendation systems; Internet marketing; DNA sequencing; spell checking (suggesting correct spelling); plagiarism detection; similarity scores for predicting career paths of professional athletes; cluster analysis (assignment of a set of observations into subsets, i.e. clusters, so that observations in the same cluster are similar in some sense, usually based on Euclidean distance; multivariate density estimation and pattern classification; and machine learning.

The inventor of the present invention has devised methods, which allow shorter search times, and is further easily adaptable for parallel processing, allowing shortening the search time additionally.

According to an aspect of the present invention it concerns a method for matching a specific vector among a data set consisting of a plurality of vectors, the method comprising the steps of:

i. Selecting a reference point vector;
ii. Calculating the distances between said reference point vector and the vectors of the data set, d;
iii. Sorting the vectors of the data set into groups of vectors having the same distance, $d_{group}$, from said reference point vector;
   a. Subsequently rearranging each of the groups, which comprises more than two vectors, such that the second vector of the group has minimum distance to the first vector of the group, and each subsequent vector of the group has minimum distance to the previous vector of the group;
iv. Identifying the best match for said specific vector by:
   a. Calculating the distance, $d_{specific}$, between said reference point vector and said specific vector;
   b. Identifying the group or groups having vectors with a distance, d, closest to said calculated distance, $d_{specific}$;
   c. Identifying the vector or vectors within the identified group or groups having the closest distance, $d_{minimum}$, to said specific vector;
   d. Identifying any additional group with distances, d, from said reference point vector in the interval from the larger of zero and $d_{specific} - d_{minimum}$ to $d_{specific} + d_{minimum}$; and
   e. Repeating steps iv.c. and iv.d. until all groups in said interval have been examined.

The person skilled in the art will realize that the method is adaptable for matrices and tensors as well.

The search for better matches is adaptable for parallel processing.

The person skilled in the art will further realize that this method is easily adaptable to find second best fit, third best fit, etc.

According to an aspect of the present invention it concerns a method for matching a specific vector among a data set consisting of a plurality of vectors, wherein the vectors represent scale invariant features, to identify scale invariant features in at least one image, the method comprising the steps of:

i. Selecting a reference point vector;
ii. Calculating the distances between said reference point vector and the vectors of the data set, d;
iii. Sorting the vectors of the data set into groups of vectors having the same distance, $d_{group}$, from said reference point vector;
   a. Subsequently rearranging each of the groups, which comprises more than two vectors, such that the second vector of the group has minimum distance to the first vector of the group, and each subsequent vector of the group has minimum distance to the previous vector of the group;

iv. Identifying the best match for said specific vector by:
   a. Calculating the distance, $d_{specific}$, between said reference point vector and said specific vector;
   b. Identifying the group or groups having vectors with a distance, d, closest to said calculated distance, $d_{specific}$;
   c. Identifying the vector or vectors within the identified group or groups having the closest distance, $d_{minimum}$, to said specific vector;
   d. Identifying any additional group with distances, d, from said reference point vector in the interval from the larger of zero and $d_{specific}-d_{minimum}$ to $d_{specific}+d_{minimum}$; and
   e. Repeating steps iv.c. and iv.d. until all groups in said interval have been examined.

According to an aspect of the present invention it concerns a method for arranging a data set consisting of a plurality of vectors for subsequent matching a specific vector among the data set, the method comprising the steps of:
   i. Selecting a reference point vector;
   ii. Calculating the distances between said reference point vector and the vectors of the data set, d;
   iii. Sorting the vectors of the data set into groups of vectors having the same distance, $d_{group}$, from said reference point vector; and
   iv. Subsequently rearranging each of the groups, which comprises more than two vectors, such that the second vector of the group has minimum distance to the first vector of the group, and each subsequent vector of the group has minimum distance to the previous vector of the group.

This aspect allows subsequent fast match of a specific vector among the data set.

According to an aspect of the present invention it concerns a method for arranging a data set consisting of a plurality of vectors for subsequent matching a specific vector among the data set, the vectors representing scale invariant features in at least one image, for subsequently identifying scale invariant features in at least one image, the method comprising the steps of:
   i. Selecting a reference point vector;
   ii. Calculating the distances between said reference point vector and the vectors of the data set, d;
   iii. Sorting the vectors of the data set into groups of vectors having the same distance, $d_{group}$, from said reference point vector; and
   iv. Subsequently rearranging each of the groups, which comprises more than two vectors, such that the second vector of the group has minimum distance to the first vector of the group, and each subsequent vector of the group has minimum distance to the previous vector of the group.

According to an aspect of the present invention it concerns a method for identifying image features which are stable across different scales in an original image defined by a plurality of pixels, the method comprising:
   a. Obtaining multiple difference images from an original image by calculating the difference obtained by applying different degrees of blurring to said original image;
   b. Locating pixel amplitude extrema in said multiple difference images;
   c. Producing a pixel gradient vector for each pixel in each difference image;
   d. Associating vector orientations with respective actual maximal and minimal amplitude pixels associated with each difference image, applying a method according to the invention.

According to an aspect of the present invention it concerns an image processing device for identifying scale invariant features in an image defined by a plurality of pixels, said image processing device comprising a processor circuit configured to: Implement a method according to the invention.

According to an aspect of the present invention it concerns a software program implementing a method according to the invention.

According to an aspect of the present invention it concerns a computer program comprising program code means for performing all the steps of any one of the method claims when said program is run on a computer.

According to an aspect of the present invention it concerns a computer program product comprising program code means stored on a computer readable medium for performing the method of any one of the method claims when said program product is run on a computer.

DETAILED DISCLOSURE

Additional aspects and embodiments are provided below.

According to an embodiment of the invention it concerns a method for matching a specific vector among a data set consisting of a plurality of vectors, the method comprising the steps of:
   i. Selecting a reference point vector;
   ii. Calculating the distances between said reference point vector and the vectors of the data set, d;
   iii. Sorting the vectors of the data set into groups of vectors having the same distance, $d_{group}$, from said reference point vector;
   iv. Subsequently rearranging each of the groups, which comprises more than two vectors, such that the second vector of the group has minimum distance to the first vector of the group, and each subsequent vector of the group has minimum distance to the previous vector of the group;
   v. Identifying the best match for said specific vector by:
      a. Calculating the distance, $d_{specific}$, between said reference point vector and said specific vector;
      b. Identifying the group or groups having vectors with a distance, d, closest to said calculated distance, $d_{specific}$;
      c. Identifying the vector or vectors within the identified group or groups having the closest distance, $d_{minimum}$, to said specific vector;
      d. Identifying any additional group with distances, d, from said reference point vector in the interval from the larger of zero and $d_{specific}-d_{minimum}$ to $d_{specific}+d_{minimum}$; and
      e. Repeating steps v.c. and v.d. until all groups in said interval have been examined.

It is necessary to take the larger of zero and $d_{specific}-d_{minimum}$, as $d_{specific}-d_{minimum}$ may be smaller than zero.

Preferably the whole interval is used, i.e. including the groups having distances from said reference point vector of the limiting values of i) the larger of zero and $d_{specific}-d_{minimum}$ and ii) $d_{specific}+d_{minimum}$. In a less preferred method only groups within this interval is used, e.g. to save time, when only good candidates are sought.

The distance $d_{minimum}$ becomes shorter as better matches are identified. Hence, the interval $d_{specific}-d_{minimum}$ to $d_{specific}+d_{minimum}$ becomes smaller, and the additional groups to be examined decreases in number.

The search for better matches is adaptable for parallel processing; e.g. the search may be conducted by searching for groups having distances d shorter than $d_{specific}$ and independently for groups having distances d longer than $d_{specific}$. Such independent searches could suitably compare and following share the hitherto shortest distance identified, $d_{minimum}$.

This method is furthermore easily adaptable to find second best fit, third best fit, etc.

According to an embodiment of the invention it concerns a method for matching a specific vector among a data set consisting of a plurality of vectors, wherein the vectors represent scale invariant features, to identify scale invariant features in at least one image, the method comprising the steps of:
  i. Selecting a reference point vector;
  ii. Calculating the distances between said reference point vector and the vectors of the data set, d;
  iii. Sorting the vectors of the data set into groups of vectors having the same distance, $d_{group}$, from said reference point vector;
  iv. Subsequently rearranging each of the groups, which comprises more than two vectors, such that the second vector of the group has minimum distance to the first vector of the group, and each subsequent vector of the group has minimum distance to the previous vector of the group;
  v. Identifying the best match for said specific vector by:
    a. Calculating the distance, $d_{specific}$, between said reference point vector and said specific vector;
    b. Identifying the group or groups having vectors with a distance, d, closest to said calculated distance, $d_{specific}$;
    c. Identifying the vector or vectors within the identified group or groups having the closest distance, $d_{minimum}$, to said specific vector;
    d. Identifying any additional group with distances, d, from said reference point vector in the interval from the larger of zero and $d_{specific} - d_{minimum}$ to $d_{specific} + d_{minimum}$; and
    e. Repeating steps v.c. and v.d. until all groups in said interval have been examined.

According to an embodiment of the invention it concerns a method according to the invention, wherein the next group to be examined is the unexamined group having the distance d closest to $d_{specific}$. An unexamined group is a group, for which the vectors of the group have not yet been examined for identification of vectors closer to the specific vector than $d_{minimum}$.

As alternatives, the search may be made e.g. starting from group(s) having the distance closest to $d_{specific}$ and going down or up among the unexamined groups; or preferably down and up at the same time, by using parallel processing.

According to an embodiment of the invention it concerns a method according to the invention, wherein the vectors represent features in at least one image.

According to an embodiment of the invention it concerns a method according to the invention, wherein the vectors represent scale invariant features in at least one image.

According to an embodiment of the invention it concerns a method according to the invention, wherein the method is used for identifying scale invariant features in at least one image.

According to an embodiment of the invention it concerns a method according to the invention, wherein the vectors are multi-dimensional.

According to an embodiment of the invention it concerns a method according to the invention, wherein said distances, d, $d_{group}$, $d_{specific}$ and $d_{minimum}$, are calculated as a distance selected among the group consisting of Euclidean, Mahalanobis, Manhattan, Chebyshev and Minkowski distance. Mahalanobis distance implies normalization based on a covariance matrix to make the distance metric scale-invariant. Manhattan distance implies measuring distance following only axis-aligned directions. Chebyshev distance implies measuring distance assuming only the most significant dimension is relevant. Minkowski distance implies a generalization that unifies Euclidean distance, Manhattan distance, and Chebyshev distance.

According to an embodiment of the invention it concerns a method according to the invention, wherein said distances, d, $d_{group}$, $d_{specific}$ and $d_{minimum}$, are calculated as Euclidean distance.

According to an embodiment of the invention it concerns a method according to the invention, wherein said reference point vector is selected among the data set.

According to an embodiment of the invention it concerns a method according to the invention, wherein said reference point vector is selected as the midpoint of the data set.

According to an aspect of the invention it concerns a method for arranging a data set consisting of a plurality of vectors for subsequent matching a specific vector among the data set, the method comprising the steps of:
  i. Selecting a reference point vector;
  ii. Calculating the distances between said reference point vector and the vectors of the data set, d;
  iii. Sorting the vectors of the data set into groups of vectors having the same distance, $d_{group}$, from said reference point vector; and
  iv. Subsequently rearranging each of the groups, which comprises more than two vectors, such that the second vector of the group has minimum distance to the first vector of the group, and each subsequent vector of the group has minimum distance to the previous vector of the group.

According to an aspect of the invention it concerns a method for arranging a data set consisting of a plurality of vectors for subsequent matching a specific vector among the data set, the vectors representing scale invariant features in at least one image, for subsequently identifying scale invariant features in at least one image, the method comprising the steps of:
  i. Selecting a reference point vector;
  ii. Calculating the distances between said reference point vector and the vectors of the data set, d;
  iii. Sorting the vectors of the data set into groups of vectors having the same distance, $d_{group}$, from said reference point vector; and
  iv. Subsequently rearranging each of the groups, which comprises more than two vectors, such that the second vector of the group has minimum distance to the first vector of the group, and each subsequent vector of the group has minimum distance to the previous vector of the group.

According to an embodiment of the invention it concerns this aspect of the method used for matching a specific vector among a data set consisting of a plurality of vectors, preferably for identifying scale invariant features in at least one image, the method further comprising the steps of:
  v. Identifying the best match for the specific vector by:
    a. Calculating the distance, $d_{specific}$, between said reference point vector and said specific vector;
    b. Identifying the group or groups having vectors with a distance, d, closest to said calculated distance, $d_{specific}$;
    c. Identifying the vector or vectors within the identified group or groups having the closest distance, $d_{minimum}$, to said specific vector;

d. Identifying any additional group with distances, d, from said reference point vector in the interval from the larger of zero and $d_{specific} - d_{minimum}$ to $d_{specific} + d_{minimum}$; and e. Repeating steps v.c. and v.d. until all groups in said interval have been examined.

This embodiment shows that this aspect of the method may first arrange the data set, and subsequently allow for each match to be completed rapidly.

According to an embodiment of the invention it concerns a method according to the invention for identifying image features which are stable across different scales in an original image defined by a plurality of pixels, the method comprising:

a. Obtaining multiple difference images from an original image by calculating the difference obtained by applying different degrees of blurring to said original image;

b. Locating pixel amplitude extrema in said multiple difference images;

c. Producing a pixel gradient vector for each pixel in each difference image;

d. Associating vector orientations with respective actual maximal and minimal amplitude pixels associated with each difference image, applying the method according to the invention.

According to an embodiment of the invention it concerns an image processing device for identifying scale invariant features in an image defined by a plurality of pixels, said image processing device comprising a processor circuit configured to: Implement the method according to the invention.

According to an embodiment of the invention it concerns a image processing device according to the invention, said image processing device comprising multiple chips, each chip configured to perform part of the identification of the best match for the specific vector.

According to an embodiment of the invention it concerns an image processing device according to the invention, said image processing device comprising at least one element selected among the group consisting of a GPU, DSP, FPGA and an ASIC.

According to an embodiment of the invention it concerns an image processing device according to the invention, said image processing device comprising: Means for storing the reference point vector, the sorted vectors of the data set, the distances, d and $d_{group}$; and means for receiving the specific vector.

According to an embodiment of the invention it concerns a computer program comprising program code means for performing all the steps of any one of the claims when said program is run on a computer.

According to an embodiment of the invention it concerns a computer program product comprising program code means stored on a computer readable medium for performing the method of any one of the claims when said program product is run on a computer.

According to an embodiment of the invention it concerns a software program for implementing the method according to the invention.

According to an embodiment of the invention it concerns a software program according to the invention, adapted to identify scale invariant features in an image defined by a plurality of pixels.

All cited references are incorporated by reference.

The accompanying figures and example(s) are provided to explain rather than limit the present invention. It will be clear to the person skilled in the art that aspects, embodiments and claims of the present invention may be combined.

FIGURES

The figures are introduced below and subsequently some figures are further explained.

Figure 5:
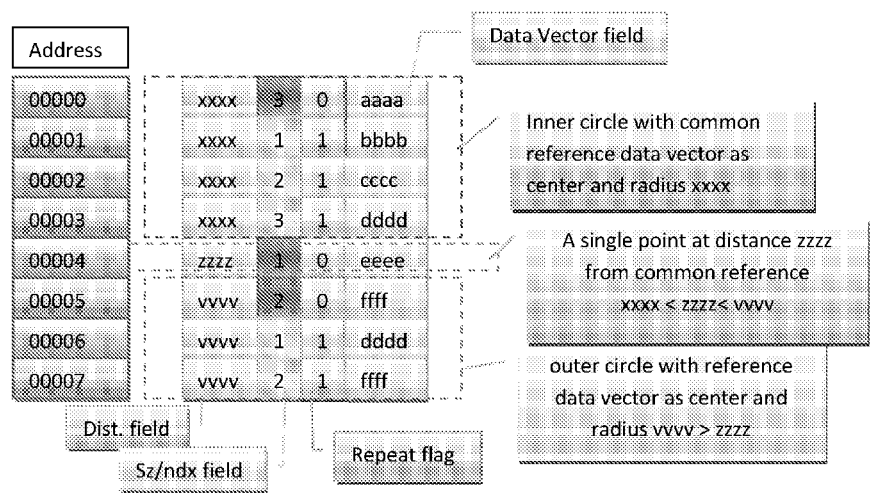
FIG. 5 shows an illustrative example of data arrangement in the extended FIFO.
Figure 5B:
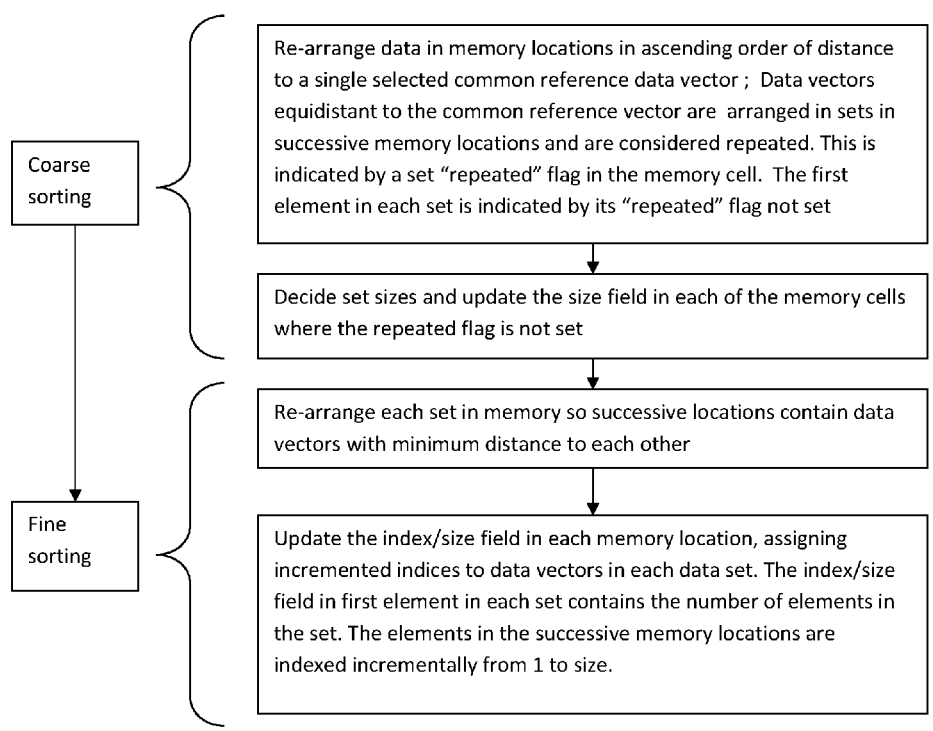

FIG. 5B outlines an embodiment of a data sorting process.

Figure 5C:
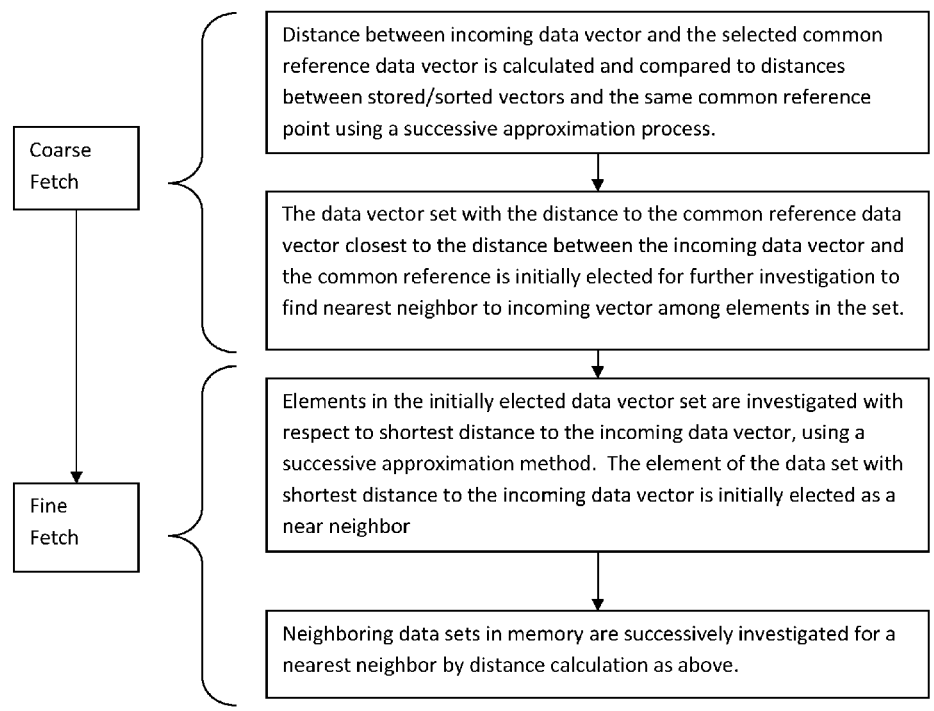

FIG. 5C outlines an embodiment of a vector matching process.

FIG. 5D outlines an embodiment of a coarse fetch.

FIGS. 5E and 5F outlines an embodiment of a fine fetch.

Figure 6:
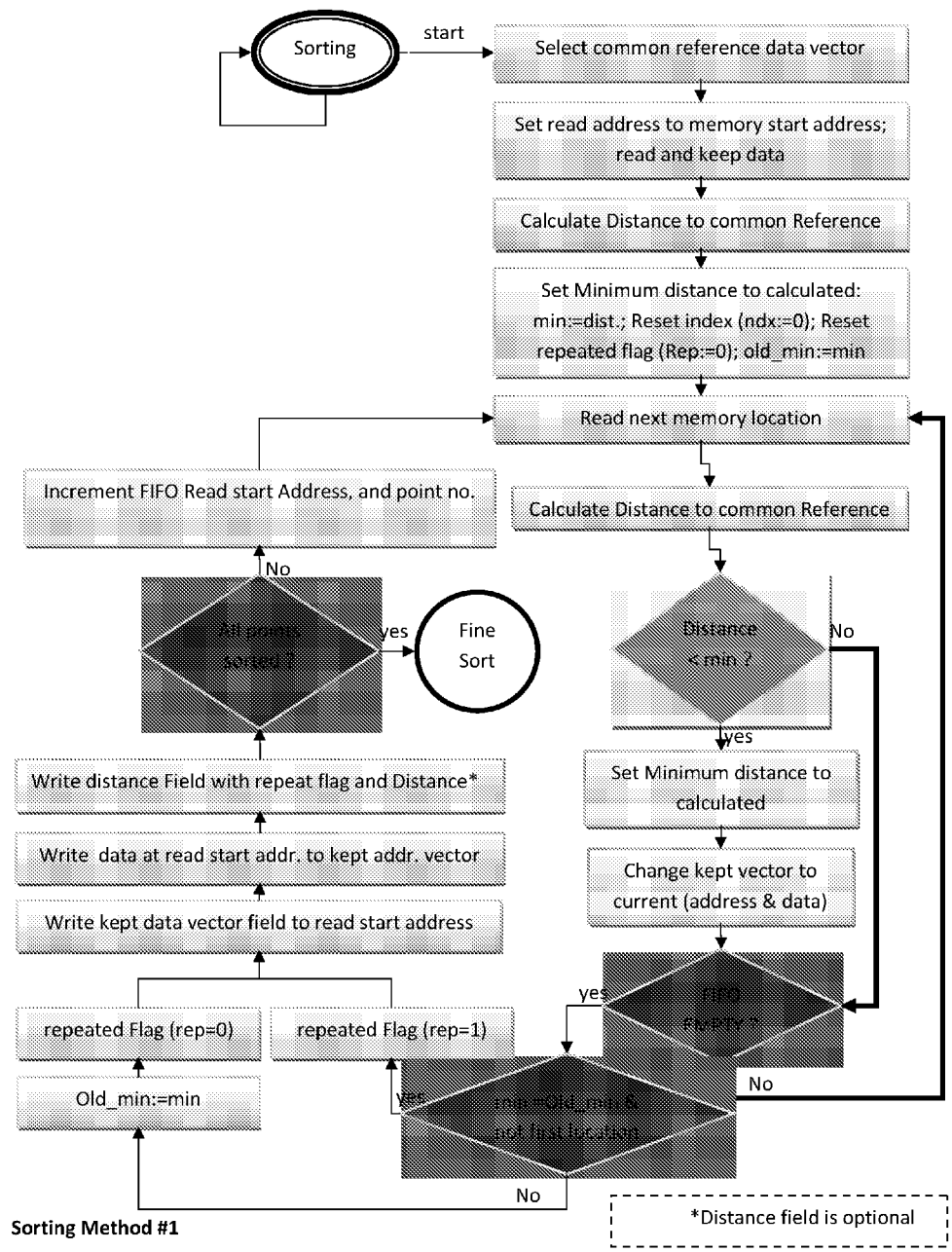

FIG. 6 shows a flow chart depicting a first sorting method.

Figure 7:
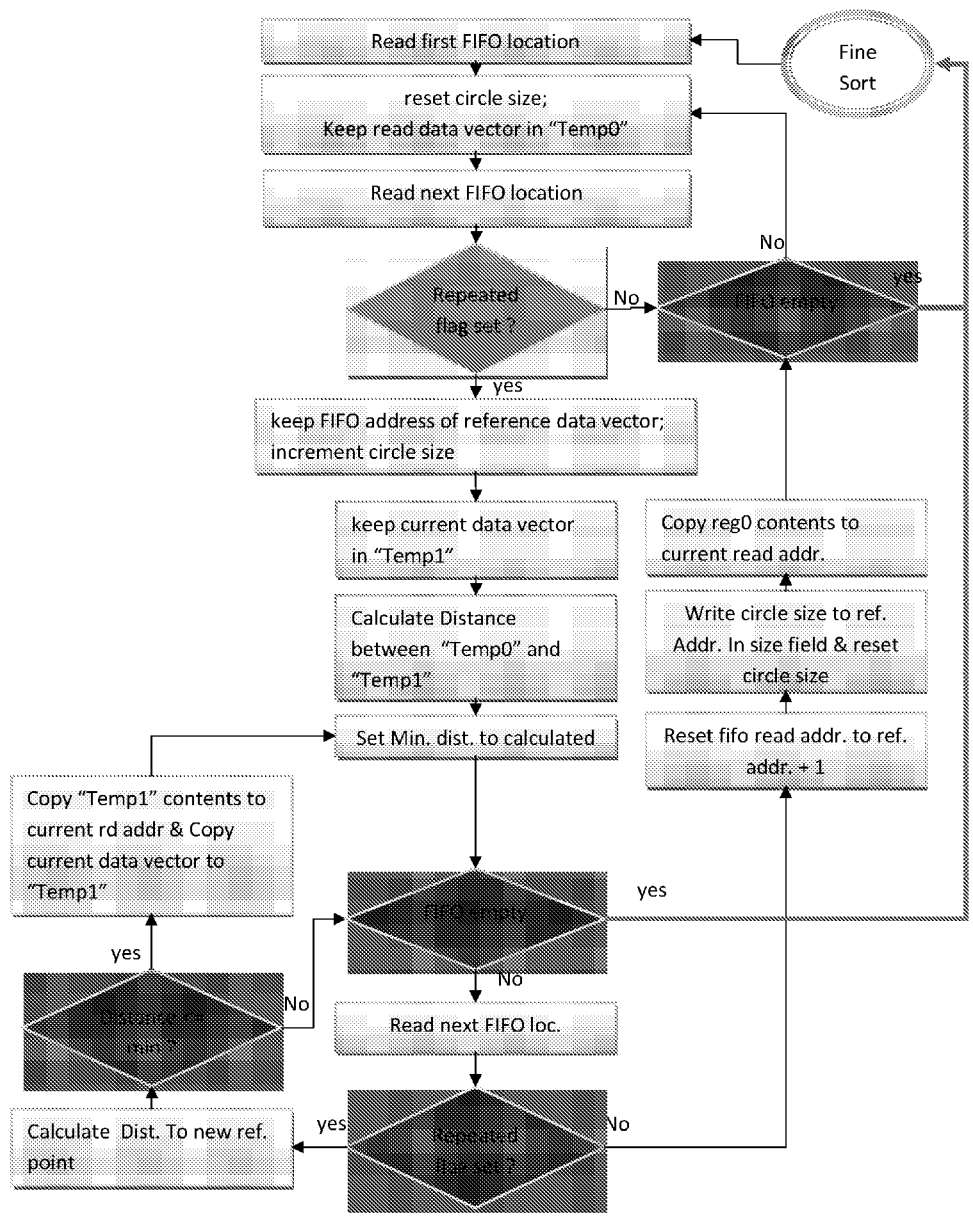

FIG. 7 shows a flow chart depicting a second sorting method.

Figure 8:
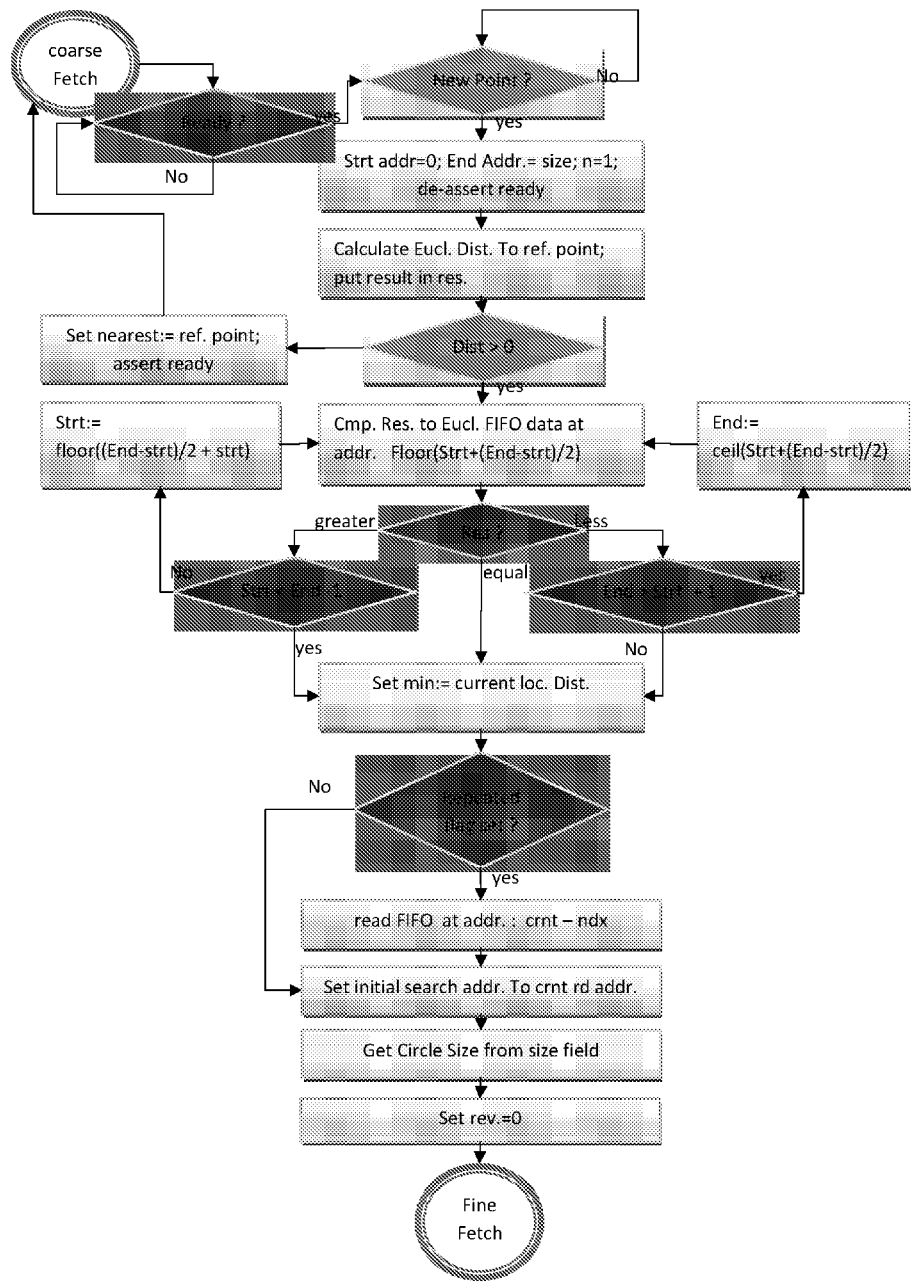

FIG. 8 shows a flow chart depicting a coarse fetching and data vector matching method.

Figure 9:
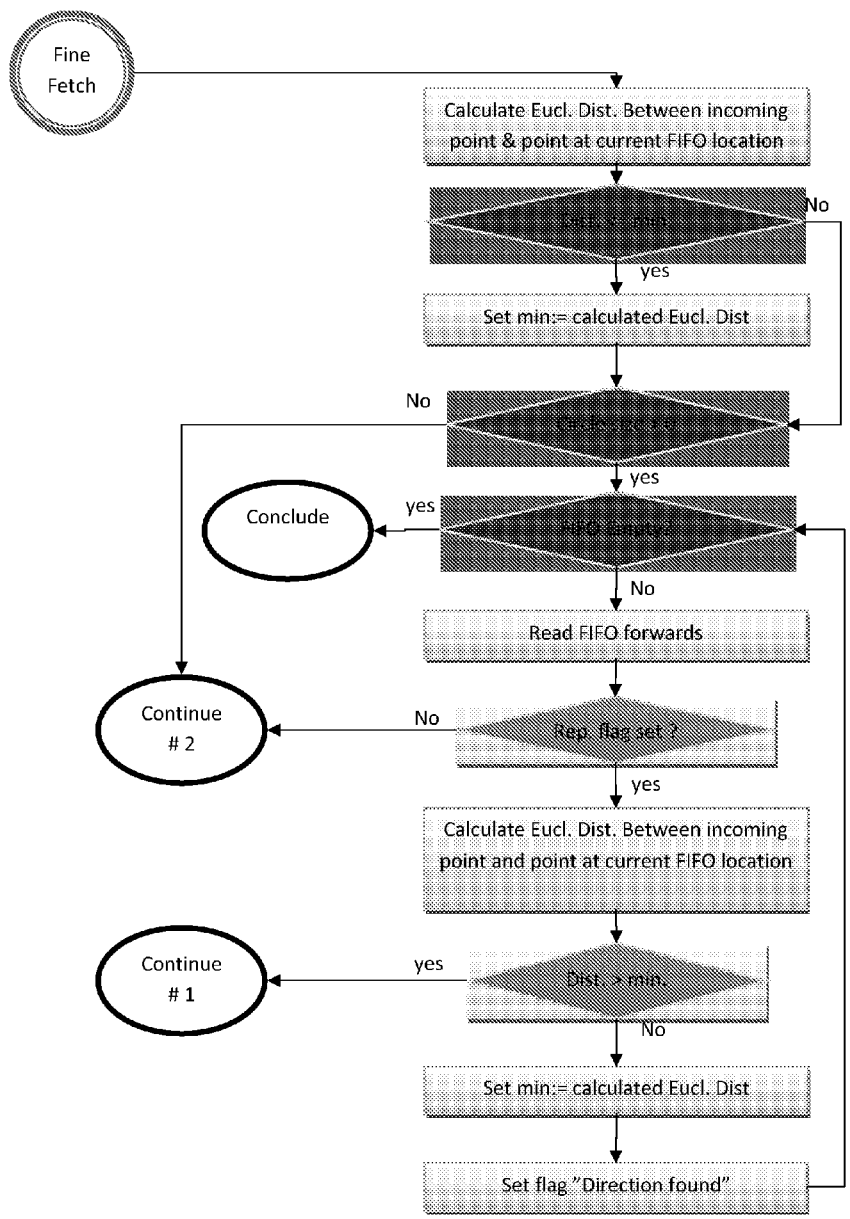

FIG. 9 shows a flow chart depicting a coarse fetching and data vector matching method for small databases.

Figure 10:
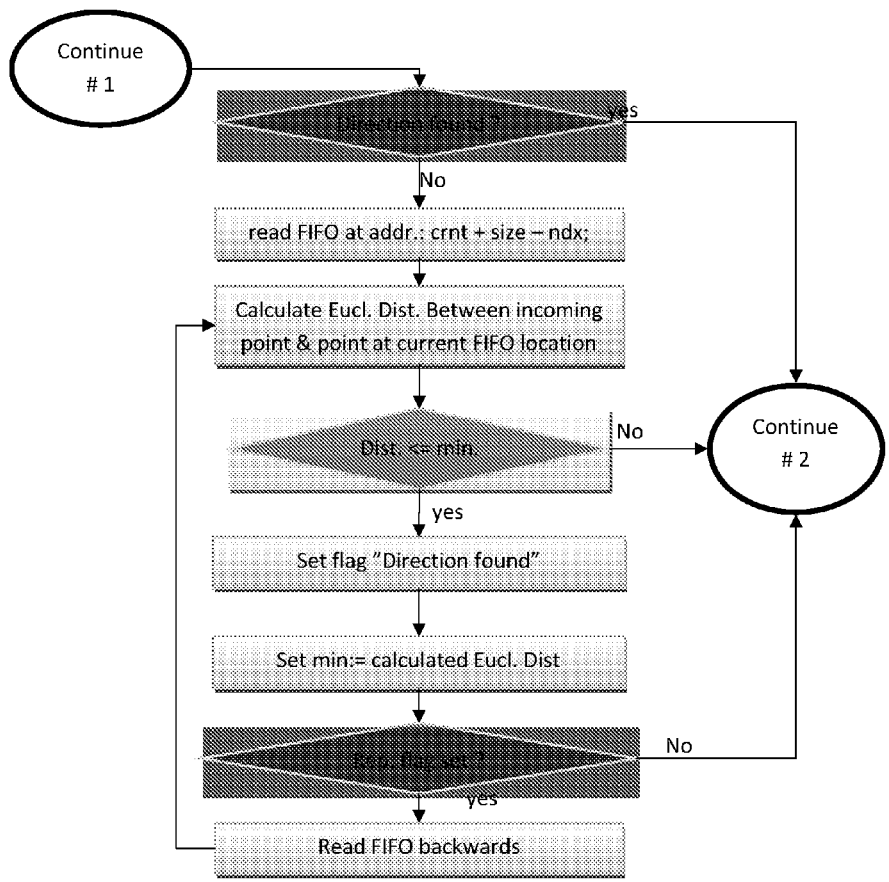

FIG. 10 shows a continuation of FIG. 9.

Figure 11:
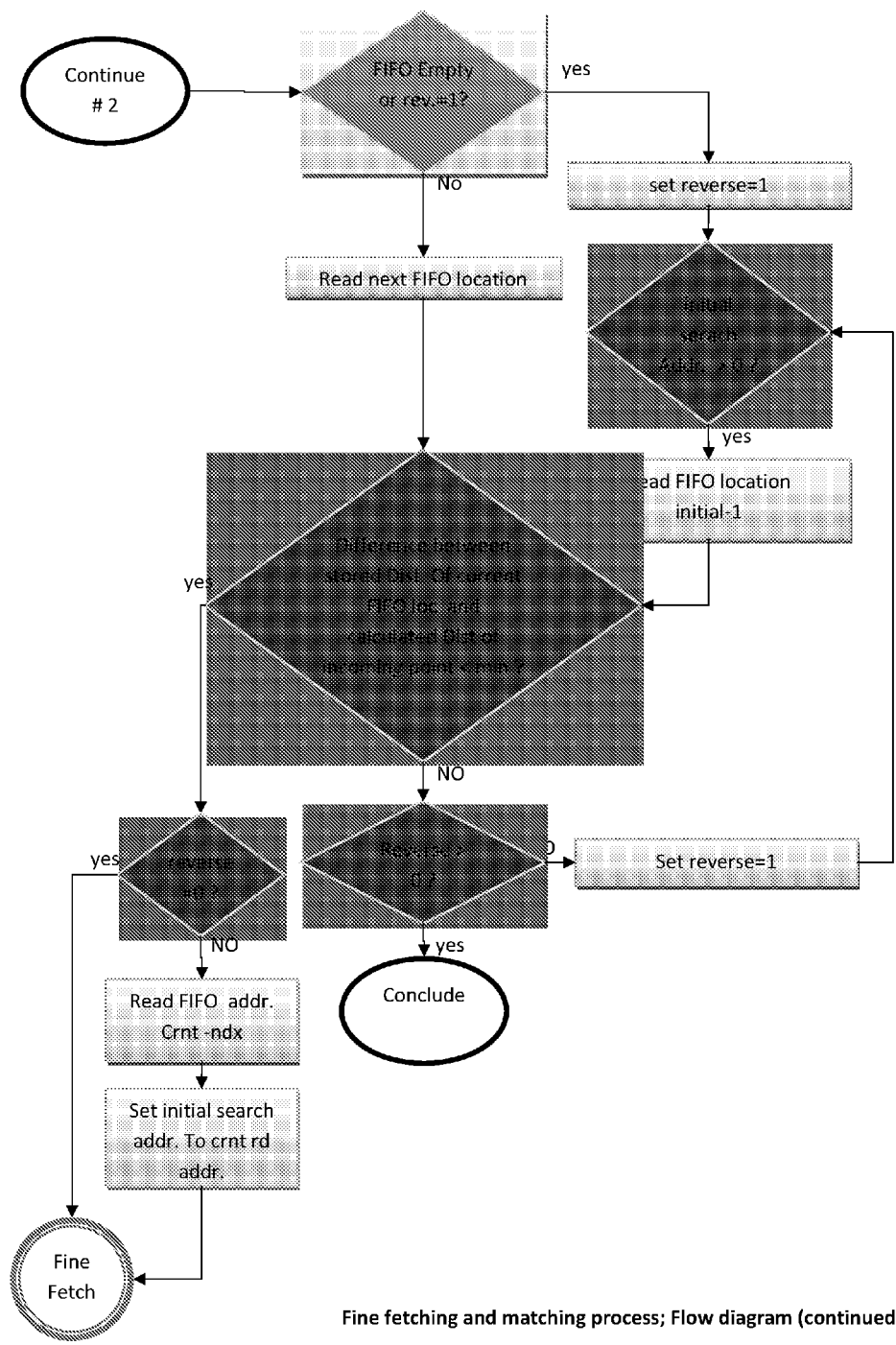

FIG. 11 shows a continuation of FIG. 9.

Figure 12:
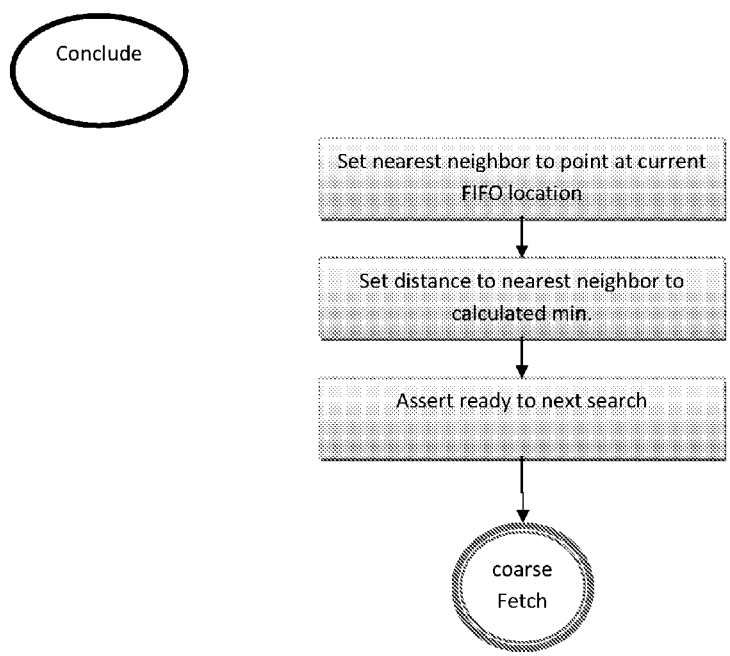

FIG. 12 shows a continuation of FIG. 9.

Figure 13:
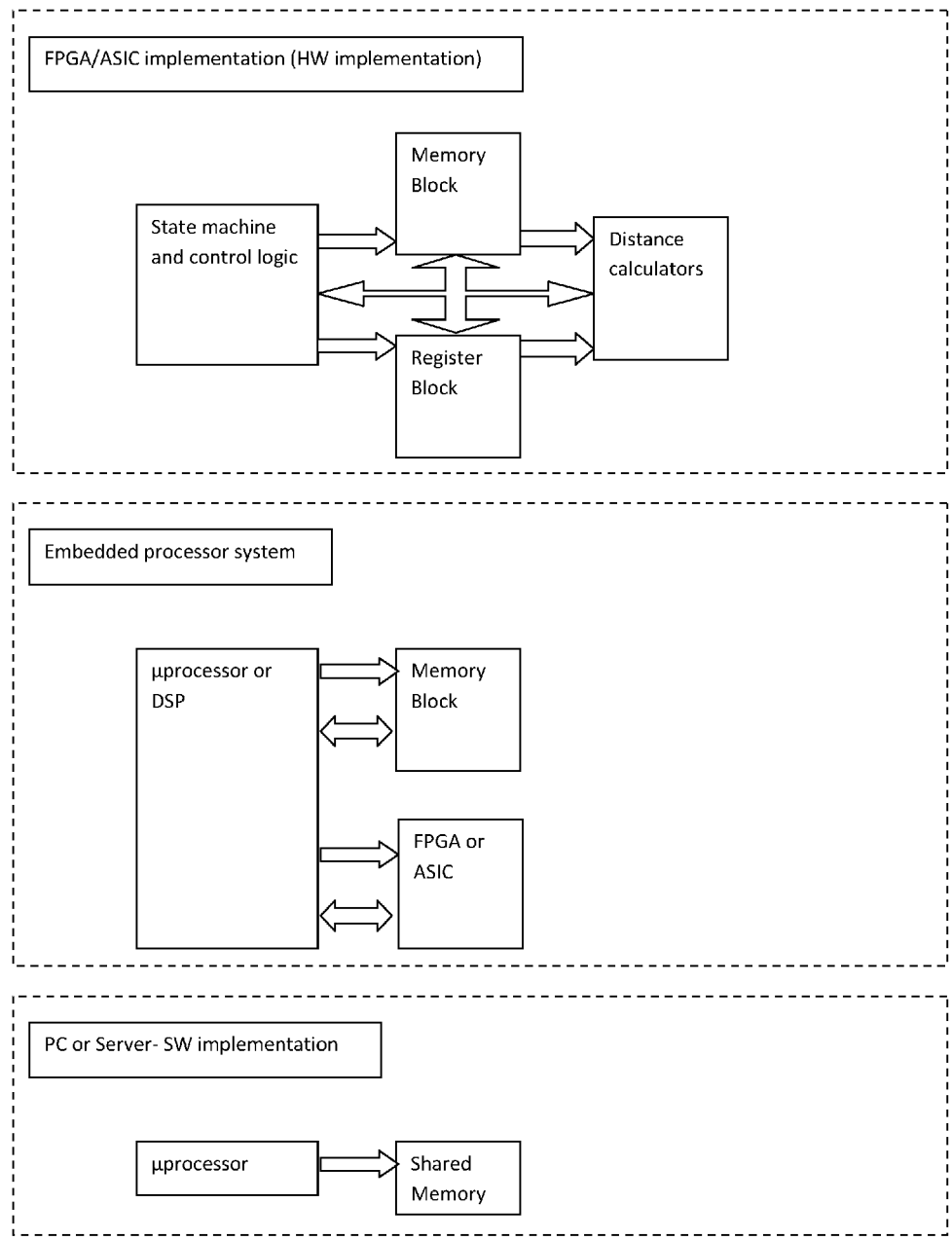

FIG. 13 shows schematic hardware implementations for a method of the present invention.

Figure 14:
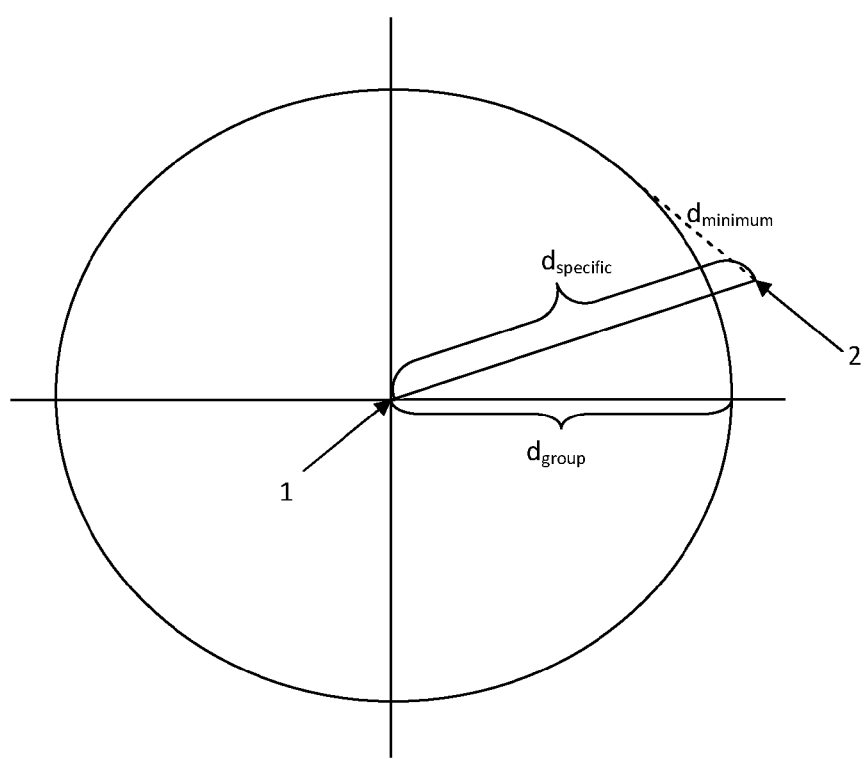

FIG. 14 shows an illustrative example of mapping in Euclidean space. A reference point vector (indicated by the tip of the arrow 1) has been selected. In FIG. 14 it is shown to be at the origin of the axes. Vectors of equal distance to the reference point vector are grouped together. This is indicated with the circle on FIG. 14, and the equal distance from the reference point vector for this group is $d_{group}$. The distance, $d_{specific}$, between the reference point vector and a specific vector (indicated by the tip of the arrow 2) to be matched is calculated. The group of vectors having $d_{group}$ closest to $d_{specific}$ is selected. Among these, the vector with minimum distance, $d_{minimum}$, to the specific vector is found. Subsequently, only unexamined groups with distances in the interval from the larger of zero and $d_{specific} - d_{minimum}$ to $d_{specific} + d_{minimum}$ need to be examined. As vectors with smaller minimum distance $d_{minimum}$ are identified, fewer unexamined groups need to be searched for identifying a better match.

EXAMPLE

This example concerns a method implementing an embodiment of the invention for high speed data vector matching by organizing and searching n-dimensional data vectors in memory elements. This method is useful for several applications, such as searches involving a multidimensional search key (e.g. range searches and nearest neighbor searches). This method relies on statically structuring reference data vectors in special memory constructions in a manner to speed up the search and matching with dynamically entered data vectors in real time.

Figure 1:
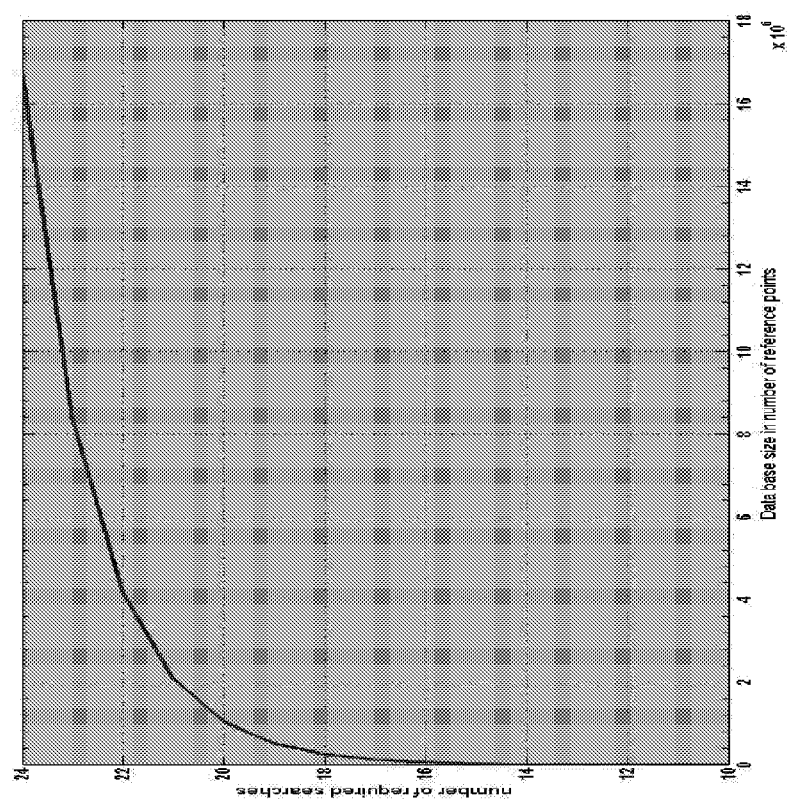
FIG. 1 shows the expected number of searches as a function of data base size.

This method and the invention potentially reduces the number of searches within a data base to find a match between data vectors to a factor of $\log_2(\text{size})$, wherein size is the size of the reference database in number of data vectors. This is illustrated in FIG. 1.

This method may be implemented in GPUs, DSPs and parallel processing hardware such as FPGAs and ASICs.

This method works by structuring reference data vectors in a specific arrangement that enables an adaptive and accelerated search and matching scheme with an incoming data vector. This method comprises a sorting phase and a search and match phase.

Given a data base of n-dimensional reference data vectors arbitrarily arranged in a memory element, this method solves the problem of finding a matching or nearest neighbor reference data vector to a new incoming data vector, among the reference data vectors. A matching data vector is in this context, defined as a vector that has the minimum distance (for instance Euclidean distance) to the incoming data vector.

Figure 2:
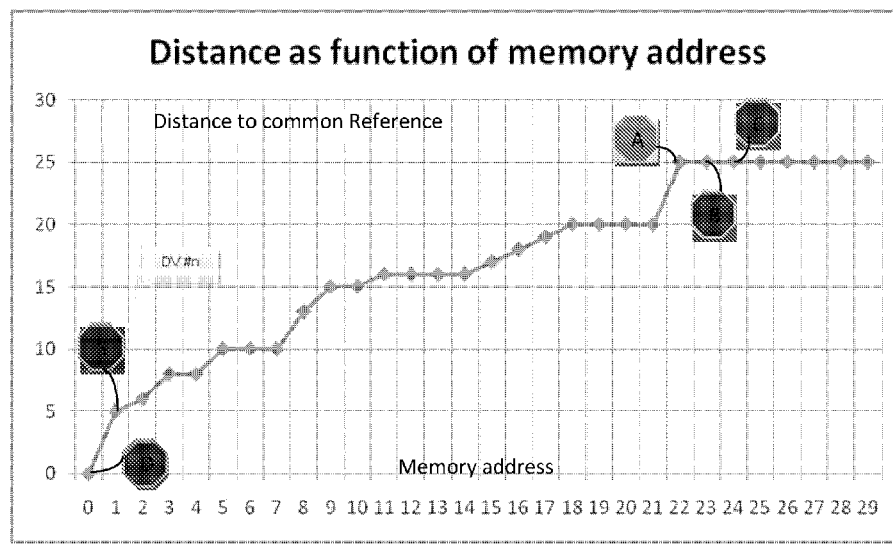
FIG. 2 shows an illustrative example of re-arranged memory.

In this method, the reference data vectors are first re-arranged in memory as function of ascending distance to a common reference data vector. The common reference data vector is chosen from the set of existing data vectors, either arbitrarily or by a definite criterion. When re-arranging is done, the data vector at the first location of the arranged memory contains a data vector having the minimum distance to the common reference vector. The following addresses in the sorted memory hold the rest of the data vectors having the same minimum distance to the reference, provided such vectors exist. Otherwise these ascending addresses hold reference data vectors with ascending distance to the common reference vector. Vectors having the same distance to the common reference are arranged in such a manner that, if address "X" in the memory holds the data vector "A" with distance "Y" to the common reference, then location "x+1" holds the data vector "B" of the reference data vectors, that have the same distance "Y" to the common reference and the minimum distance to "A" simultaneously, provided such vector exists. Location "X+2" would then hold the vector "C" having distance "Y" to the common reference and minimum distance to "B" also provided such vector exists. FIG. 2 provides an illustrative example of sorted memory arrangement. In the figure, point "D" represents the single data vector that has the absolute minimum distance to the common reference and is therefore located at the first memory address. Point "S" represents the data vector having the next shortest distance to the common reference and so on. In the figure, points "A", "B" and "C" represent 3 data vectors that have equal distance to the common reference point. Point "B" represents the data vector having the shortest distance to the reference data vector represented by "A" and likewise point "C" represents the reference data vector with shortest distance to the reference data vector represented by "B".

Figure 4:
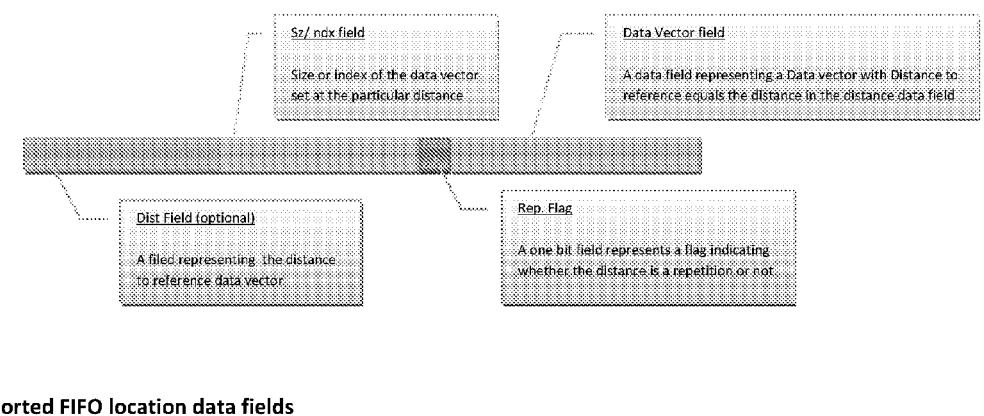
FIG. 4 shows an example of sorted FIFO location data fields.

While sorting, repeated data vectors are eliminated. Each data vector in the resulting array is saved along with its distance to the common reference point at the same memory location together with other data fields that ease indexing and search. This is illustrated in FIG. 4.

Having re-arranged the data vectors in the described manner, the fast determination of the best match or nearest neighbor to a foreign data vector, among the existing reference data vectors, is enabled using a successive approximation method. In this method, the distance of the foreign data vector to the common reference vector is first calculated and compared to the distance stored at the middle location of the arranged memory. In case the calculated distance is found less than the stored distance, then the best match is estimated to be found at the lower half of the memory space. In this case the next search will happen by comparing the calculated distance to the data vector stored at the memory location in the middle of the lower half of the memory space. On the contrary, if the calculated distance is found to be greater than the stored distance in the middle of the memory space, the nearest neighbor is estimated to be found at a location in the upper half of the arranged memory. In this case the next search is done by comparing the calculated distance to the distance stored at the middle location of the upper half of the memory space. In the last case where the calculated distance is found to be equal to the stored distance, then the nearest neighbor is estimated to be one of the reference data vectors stored around the middle memory location.

In this method, n-dimensional data vectors are coarsely sorted and stored in a FIFO in ascending order of distance to a single arbitrarily chosen reference point represented by a data vector. Thus creating a Euclidean space where all the reference data vectors are mapped to points as function of distance to a common reference point as shown in the example in FIG. 3. The respective distances to the common reference point of sorted reference points are optionally stored along with the reference points at the same memory addresses to avoid having to calculate these once again during the fetching process, the cost of this would be added requirements to memory size.

The Reference point is one of the sorted data vectors, thus the first point in the sorted memory element, e.g. FIFO, is the data vector which have the minimum distance to the reference. The following addresses in the sorted memory, hold all the data vectors having the same minimum distance to the reference arranged arbitrarily, followed by vectors having the next minimum distance to the reference and so on. Hence the last addresses in the sorted memory hold the set of data vectors having the maximum distance to the reference data vector. In the example in FIG. 3, the inner circle around the center reference point contain on its perimeter, points representing the data vector having the minimum distance to the reference, while the outer circle in thick black perimeter contains the points representing data vectors of maximum distance to the reference among the example reference data set.

Figure 3:
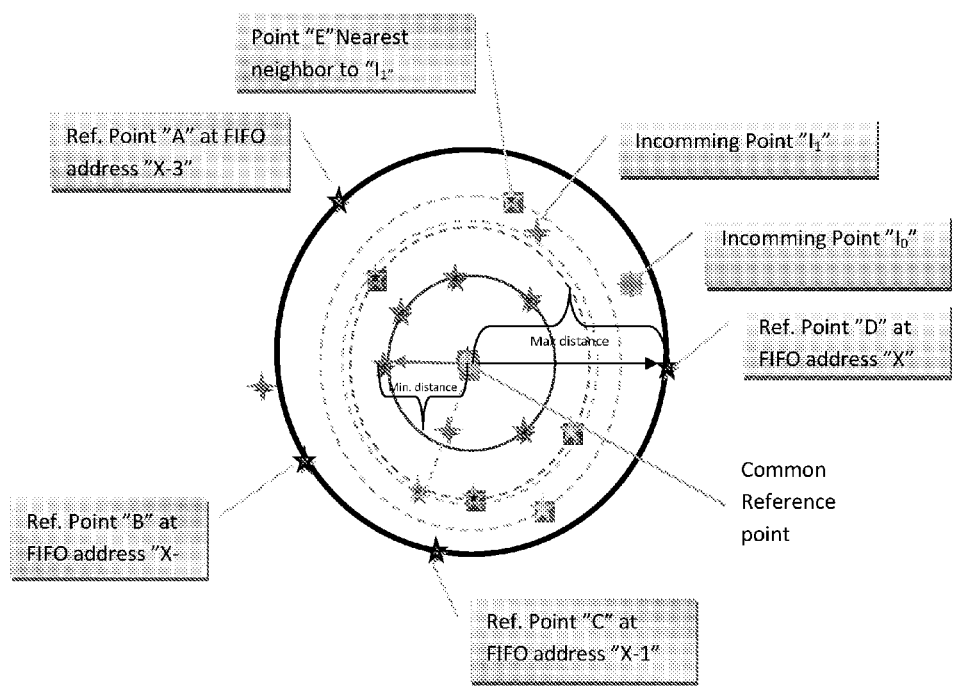
FIG. 3 shows an illustrative example of points mapping in circles on Euclidean space.

As indicated by FIG. 3, Data points with equal distance to the reference point form a perimeter of a circle, centered at the reference point, with a radius equal to the distance. In a fine sorting following the coarse sorting, these points are also arranged in FIFO as function of their mutual distance in a manner that, successive memory addresses contain closest points to each other, identified by shortest distance between them. (e.g. if address "x" contains a data point "A" with distance "y" to the common reference point, then address "x+1" would contain a data point "B" having the shortest distance to "A" and the same distance "y" to the common reference data point, provided such point exists in the set of reference points mapped see FIG. 3.). FIG. 6 and FIG. 7 illustrate the coarse and fine sorting processes respectively.

The coarse and fine sorting phases provide a FIFO/memory and data structure that aids the quick search reference data vectors for matching with incoming data vectors. The data structure at a single sorted FIFO/memory location is illustrated in FIG. 4, and the resulting FIFO/memory structure is exemplified in FIG. 5.

As indicated by the figures, each location in the extension FIFO/memory contains the following data fields (underlined):

Data Vector Filed: A data field representing the n-dimensional data vector consisting the reference point Dist. Field (optional): A data field representing the calculated distance of the particular data vector to the selected common reference data vector in this document called the common reference point. This is an optional field. It can be eliminated to reduce memory size requirements. In case it is eliminated, the distance is calculated on the fly when needed.

Size/index Field and rep. flag field: The sz/ndx field contains one of two values representing a Size or an index. In case the FIFO/memory location contains the first data vector with the distance given in the distance field, the field would contain a value representing the size of the data vector set having that same distance to the common reference, otherwise, the field would contain a number representing an incremented index of the successive data vectors with the same distance to reference.

The Rep. flag field is a Repeated flag field set to "1" if the distance in the distance field is repeated from the previous FIFO location and is reset to "0" otherwise. In the example in FIG. 5, the number "3" in the sz/ndx field at address "00000" indicates that there are a total number of 3 reference data vectors having the distance "xxxx" to the selected reference point. The "0" in the repeated flag field at address "00000" indicates that the data vector in the data vector field is the first one in the FIFO having the distance "xxxx" to the reference point. At address "00001", the repeated flag is set to "1" to indicate that the data vector at this location has the same distance to the reference point as the one at the preceding address (in this case address "00000"), the index value "1" in the sz/ndx field indicates that there is only one previous location in the FIFO that have a reference data vector with the same distance to reference as at hand, while the value "3" at address "00003" indicates that there are in total 3 previous FIFO locations that store reference data vectors having the same distance to the reference point as the data vector at this address.

The distance of an incoming data vector to the common reference point is calculated on the fly, and coarsely compared to stored distances in the sorted FIFO—Alternatively also calculated on the fly—to find the closest circle perimeter to the perimeter of a circle that might encompass the incoming point. The closest circle perimeter is found as illustrated by the flow diagram in FIG. 8. In the figure following abbreviations are used:

Addr.: abbreviating the word FIFO address.
Strt.: stands for start (i.e "strt Addr" stands for start address which is the search start address in FIFO. End Addr. Is the search end address). When the abbreviation "strt" is used alone, it means search start address.
End: means search end address.
Dist.: stands for distance
Eucl.: stands for Euclidean. In the figure the Euclidean distance is used as an example and denoted as "Eucl. Dist."
Res.: stands for result. In the figure, res is treated as a register.
Crnt.: for current; when the abbreviation is used alone, it means current FIFO address.
Ndx.: stands for Index and thereby, it is meant the index represented by the ndx data field as explained earlier in this documents. See FIG. 5.
Rev.: Is an abbreviation for the word reverse. Here rev. is a flag, when set causes reading from FIFO to happen from the last point of the current circle. Referring to FIG. 3, that would be point "D". Here, the idea is jumping irrelevant for comparison points over.
Rd. Stands for read. Here used to indicate FIFO read address and distinguish it from FIFO write address,
Size, refers to the value in the "sz" field as illustrated in FIG. 5.
Repeated flag: this is the value of the Rep. flag as illustrated in FIG. 5.
Initial: This is the initial FIFO search address found by coarse search.

The comparison is then refined to find the closest point with minimal distance to the incoming point first among points on the closest circle perimeter and adjacent perimeters. FIG. 9, FIG. 10, FIG. 11, and FIG. 12 illustrate the process of fine search and match.

APPENDIX

Image features, such as SIFT features, may be represented as vectors. This is exemplified in the present Appendix by the quotes provided below.

The person skilled in the art is familiar with the SIFT method, e.g. from U.S. Pat. No. 6,711,293 B1 and Wikipedia. Note that the U.S. Pat. No. 6,711,293 B1 uses the terminology "sets of subregion descriptors" while Wikipedia uses the terminology "descriptor vector", "vector" or "descriptor" alternately. In the present claims and the rest of the description, the term "vector" is used.

Quoting from Wikipedia "Scale-invariant feature transform" (emphasis added below):

. . .

Keypoint Descriptor

Previous steps found keypoint locations at particular scales and assigned orientations to them. This ensured invariance to image location, scale and rotation. Now we want to compute a descriptor vector for each keypoint such that the descriptor is highly distinctive and partially invariant to the remaining variations such as illumination, 3D viewpoint, etc. This step is performed on the image closest in scale to the keypoint's scale.

First a set of orientation histograms are created on 4×4 pixel neighborhoods with 8 bins each. These histograms are computed from magnitude and orientation values of samples in a 16×16 region around the keypoint such that each histogram contains samples from a 4×4 subregion of the original neighborhood region. The magnitudes are further weighted by a Gaussian function with a equal to one half the width of the descriptor window. The descriptor then becomes a vector of all the values of these histograms. Since there are 4×4=16 histograms each with 8 bins the vector has 128 elements. This vector is then normalized to unit length in order to enhance invariance to affine changes in illumination. To reduce the effects of non-linear illumination a threshold of 0.2 is applied and the vector is again normalized.

Although the dimension of the descriptor, i.e. 128, seems high, descriptors with lower dimension than this don't perform as well across the range of matching tasks . . . and the computational cost remains low due to the approximate BBF (see below) method used for finding the nearest-neighbor. Longer descriptors continue to do better but not by much and there is an additional danger of increased sensitivity to distortion and occlusion. It is also shown that feature matching accuracy is above 50% for viewpoint changes of up to 50 degrees. Therefore SIFT descriptors are invariant to minor affine changes. To test the distinctiveness of the SIFT descriptors, matching accuracy is also measured against varying number of keypoints in the testing database, and it is shown that matching accuracy decreases only very slightly for very large database sizes, thus indicating that SIFT features are highly distinctive.

. . .

Quoting from the description of U.S. Pat. No. 6,711,293 B1, [0071]:

If at block 198, the last point of interest in the subregion has been examined, then block 202 directs the processor 22 to store the angular component sets and their associated component descriptor elements in association with the region. Thus, it will be appreciated that for each full region, there are eight sets of component subregion descriptors for a total of 128 numbers, representing the entire region about the extremum. The eight sets of component subregion descriptors represent one scale invariant feature of the image.

The invention claimed is:

1. A method comprising:
identifying scale invariant features in at least one image by matching a specific vector among a dataset consisting of a plurality of vectors, wherein the vectors represent scale invariant features, comprising:
  i. Selecting a reference point vector, wherein the reference point vector is selected among the data set;
  ii. Calculating the distances, d, between said reference point vector and each of the vectors of the data set;
  iii. Re-arranging the plurality of vectors of the data set as a function of ascending distance, d, to the reference point vector;
  iv. Sorting the vectors of the data set into groups of vectors having the same distance, $d_{group}$, from said reference point vector;
  v. Subsequently rearranging the vectors of each of the groups of vectors, which comprises more than two vectors, such that the second vector of the group has a minimum distance to the first vector of the group, and each subsequent vector of the group has a minimum distance to the previous vector of the group;
  vi. Identifying the best match for said specific vector by:
    a. Calculating the distance, $d_{specific}$, between said reference point vector and the specific vector;
    b. Comparing the calculated distance, $d_{specific}$, and a distance between the reference point vector and a vector positioned in the middle of the re-arranged plurality of vectors;
    c. Identifying, using successive approximation and based on the distance between the reference point vector and a vector positioned in the middle of the re-arranged plurality of vectors, the group of vectors having vectors with a distance, d, closest to said calculated distance, $d_{specific}$;
    d. Identifying the vector or vectors within the identified group or groups having the closest distance, $d_{minimum}$, to said specific vector;
    e. Identifying any additional group with distances, d, from said reference point vector in an interval from the larger of zero and $d_{specific}-d_{minimum}$ to $d_{specific}+d_{minimum}$; and
    f. Repeating steps vi.d. and vi.e. until all groups in said interval have been examined.

2. The method according to claim 1, wherein the vectors are multiple dimensional.

3. The method according to claim 1, wherein said distances, d, $d_{group}$, $d_{specific}$ and $d_{minimum}$, are calculated as a distance selected among the group consisting of Euclidean, Mahalanobis, Manhattan, Chebyshe and Minkowski distance.

4. The method according to claim 1, wherein said distances, d, $d_{group}$, $d_{specific}$ and $d_{minimum}$, are calculated as Euclidean distance.

5. An image processing device, said image processing device comprising a processor circuit configured to:
Identify scale invariant features in an image defined by a plurality of pixels by:
  i. Selecting a reference point vector, wherein the reference point vector is selected among the data set;
  ii. Calculating the distances, d, between said reference point vector and each of the vectors of the data set;
  iii. Re-arranging the plurality of vectors of the data set as a function of ascending distance, d, to the reference point vector;
  iv. Sorting the vectors of the data set into groups of vectors having the same distance, $d_{group}$, from said reference point vector;
  v. Subsequently rearranging the vectors of each of the groups of vectors, which comprises more than two vectors, such that the second vector of the group has a minimum distance to the first vector of the group, and each subsequent vector of the group has a minimum distance to the previous vector of the group;
  vi. Identifying the best match for said specific vector by:
    a. Calculating the distance, $d_{specific}$, between said reference point vector and the specific vector;
    b. Comparing the calculated distance, $d_{specific}$, and a distance between the reference point vector and a vector positioned in the middle of the re-arranged plurality of vectors;
    c. Identifying, using successive approximation and based on the distance between the reference point vector and a vector positioned in the middle of the re-arranged plurality of vectors, the group of vectors having vectors with a distance, d, closest to said calculated distance, $d_{specific}$;
    d. Identifying the vector or vectors within the identified group or groups having the closest distance, $d_{minimum}$, to said specific vector;
    e. Identifying any additional group with distances, d, from said reference point vector in an interval from the larger of zero and $d_{specific}-d_{minimum}$ to $d_{specific}+d_{minimum}$, and
    f. Repeating steps vi.d. and vi.e. until all groups in said interval have been examined.

6. The image processing device according to claim 5, said image processing device comprising multiple chips, each chip configured to perform part of the identification of the best match for the specific vector of step vi.

7. The image processing device according to claim 5, said image processing device comprising at least one element selected among the group consisting of a GPU, DSP, FPGA and an ASIC.

8. The image processing device according to claim 5, said image processing device comprising: means for storing the reference point vector, the sorted vectors of the data set, the distances, d and $d_{group}$; and means for receiving the specific vector.

9. A non-transitory computer-readable medium storing a software program implementing the method according to claim 1.

10. The non-transitory computer-readable medium according to claim 9, adapted to identify scale invariant features in an image defined by a plurality of pixels.

* * * * *